United States Patent [19]
Thorn

[11] Patent Number: 5,720,369
[45] Date of Patent: Feb. 24, 1998

[54] ADJUSTABLE, LOCKABLE DEVICES

[75] Inventor: Richard P. Thorn, Erie, Pa.

[73] Assignee: Lord Corporation, Cary, N.C.

[21] Appl. No.: 424,925

[22] Filed: Apr. 19, 1995

[51] Int. Cl.[6] .................................................. F16F 9/32
[52] U.S. Cl. ...................................... 188/300; 267/202
[58] Field of Search ............ 188/300, 67; 267/201–203, 267/196; 248/188.5, 157, 176.2, 669, 670, 561

[56] References Cited

U.S. PATENT DOCUMENTS

| | | | |
|---|---|---|---|
| 1,772,240 | 8/1930 | Burk . | |
| 2,042,443 | 5/1936 | Buckstone | 248/161 |
| 2,630,887 | 3/1953 | Paquin | 188/96 |
| 2,644,504 | 7/1953 | Vick | 155/5.24 |
| 3,195,848 | 7/1965 | Miller et al. | 248/411 |
| 3,741,514 | 6/1973 | Snurr | 248/412 |
| 3,758,063 | 9/1973 | Lacey | 243/161 |
| 3,828,651 | 8/1974 | Dorner et al. | 91/416 |
| 3,861,815 | 1/1975 | Landaeus | 403/370 |
| 3,866,964 | 2/1975 | Prater | 294/8.6 |
| 3,885,764 | 5/1975 | Pabreza | 248/162 |
| 4,023,649 | 5/1977 | Wood | 187/8.49 |
| 4,051,929 | 10/1977 | Parfitt | 188/67 X |
| 4,113,222 | 9/1978 | Frinzel | 248/412 |
| 4,180,346 | 12/1979 | Blake | 403/109 |
| 4,221,430 | 9/1980 | Frobose | 297/353 |
| 4,583,621 | 4/1986 | Tangorra | 188/67 |
| 4,627,591 | 12/1986 | Heckmann | 248/411 |
| 4,691,890 | 9/1987 | Han | 248/412 |
| 4,706,916 | 11/1987 | Cullmann et al. | 248/168 |
| 4,765,444 | 8/1988 | Bauer et al. | 188/129 |
| 4,892,279 | 1/1990 | Lafferty et al. | 248/125 |
| 5,211,379 | 5/1993 | Porter | 267/221 |

FOREIGN PATENT DOCUMENTS

| | | | |
|---|---|---|---|
| 2161580 | 6/1978 | Germany | 188/300 |
| 3742 | 9/1984 | WIPO | 188/300 |

*Primary Examiner*—Peter M. Poon
*Attorney, Agent, or Firm*—Randall S. Wayland; James W. Wright

[57] ABSTRACT

An adjustable length strut having a unique locking device. An annular spring within a housing surrounds an actuator rod. An actuator member engages one end of the annular spring axially compressing it and causing radial bulging resulting in locking the rod in position relative to the housing. Numerous embodiments are disclosed which may replace gas springs in such applications as seat height adjusters, chair arm adjusters and seatback adjusters. An embodiment is disclosed employing a switch to activate and deactivate the actuator member.

20 Claims, 9 Drawing Sheets

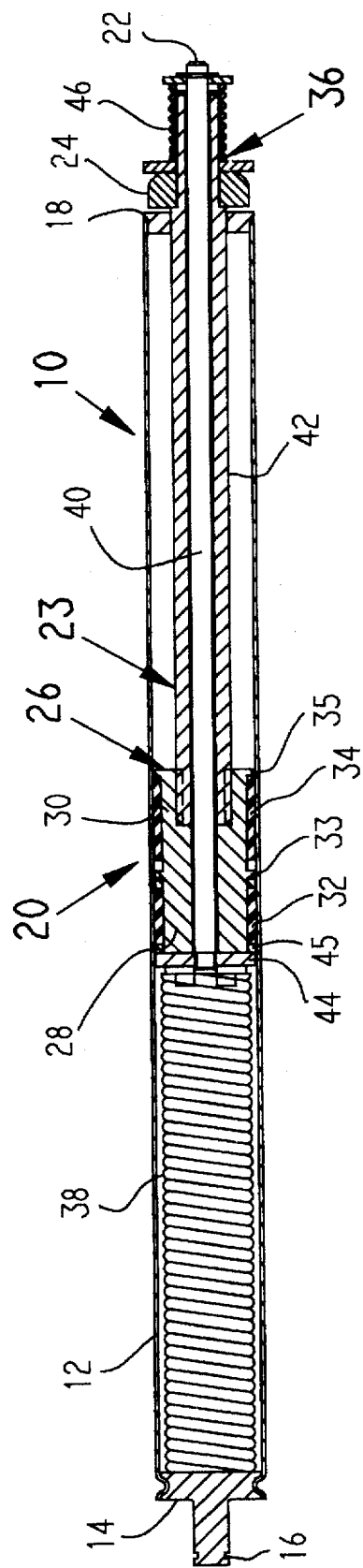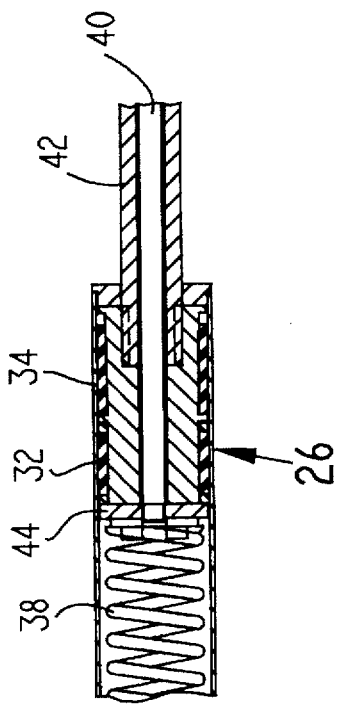

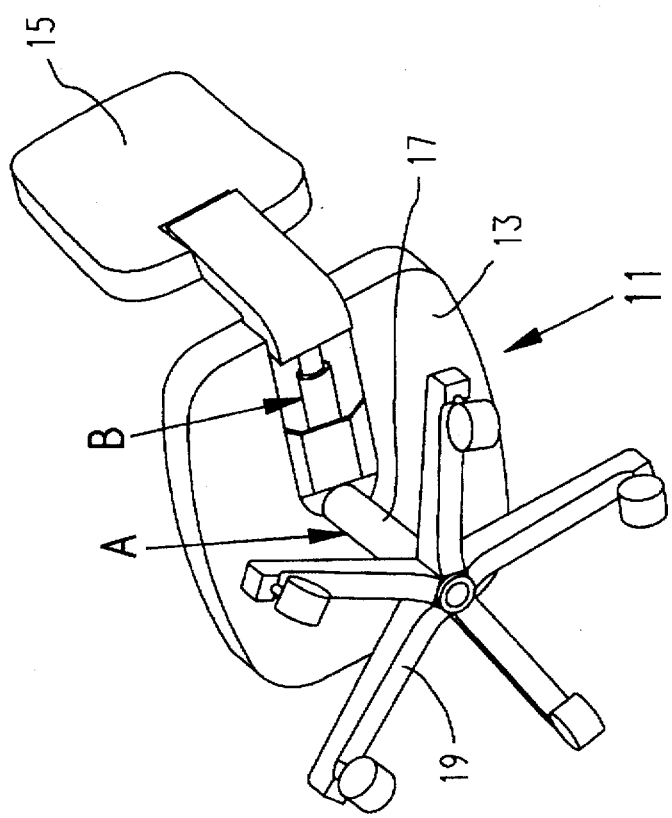
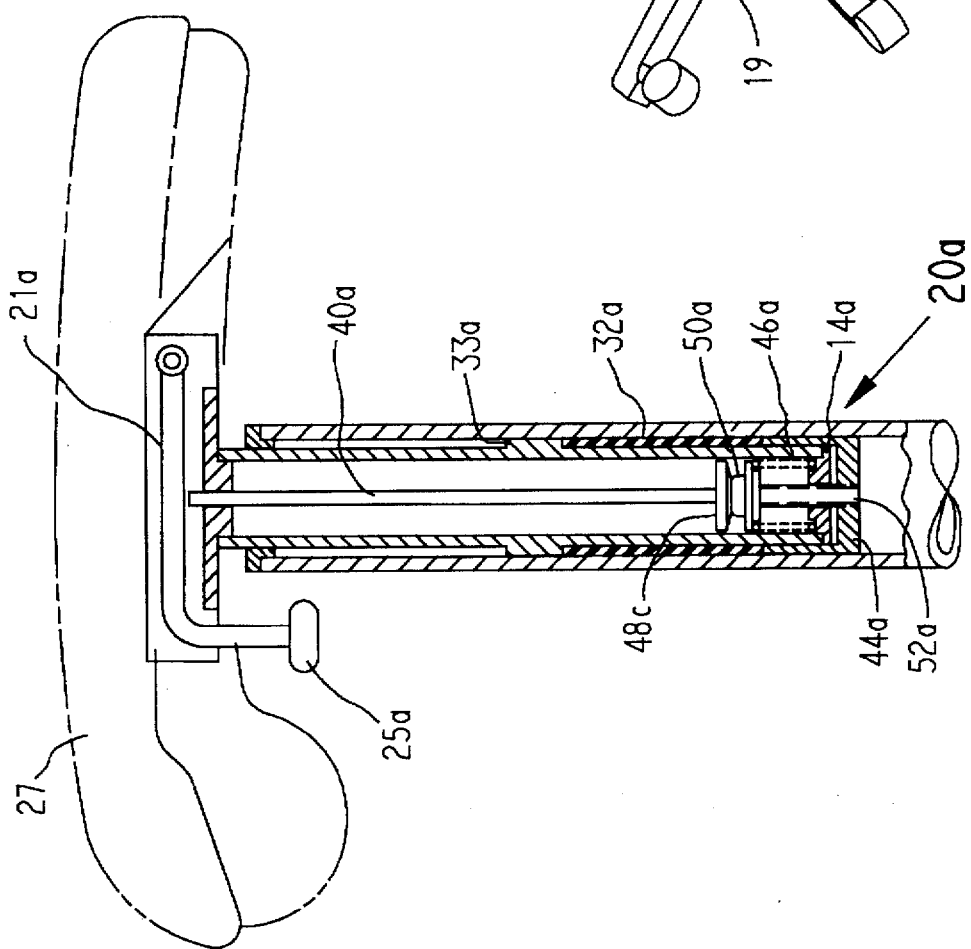
FIG. 1A
FIG. 1B

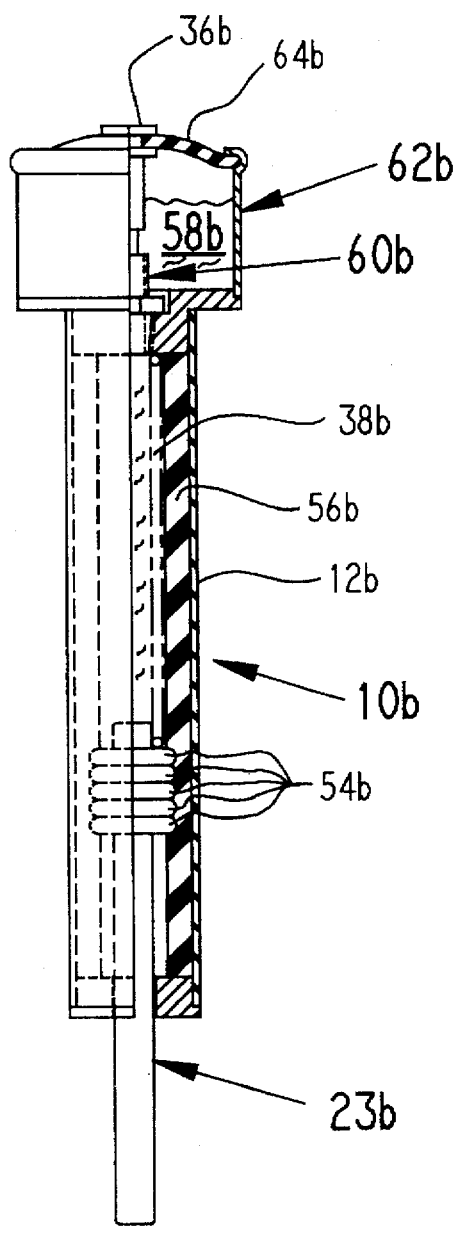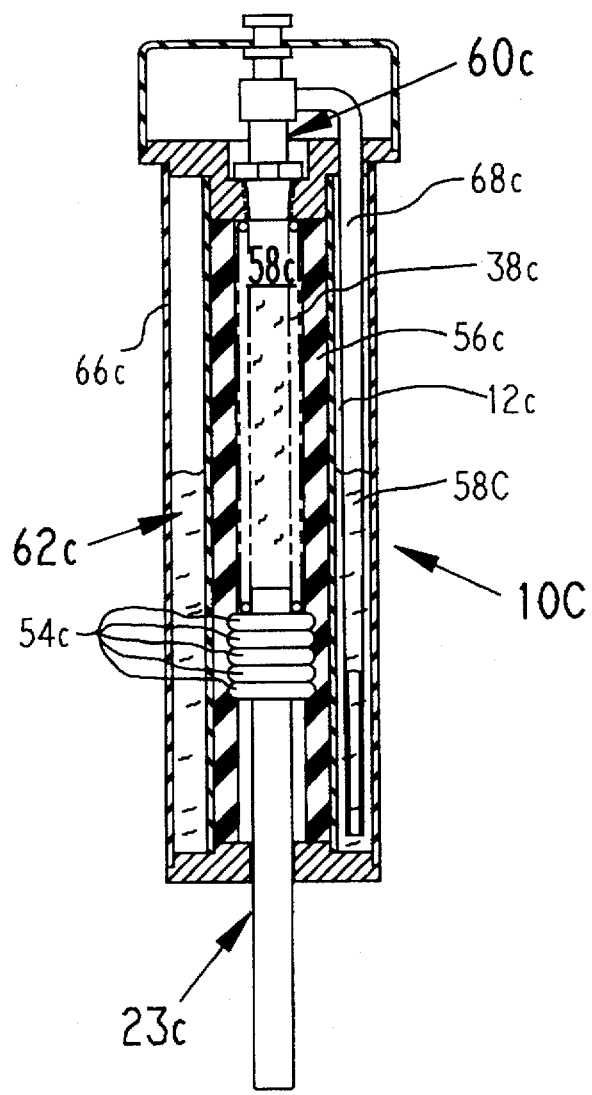
FIG. 3
FIG. 4

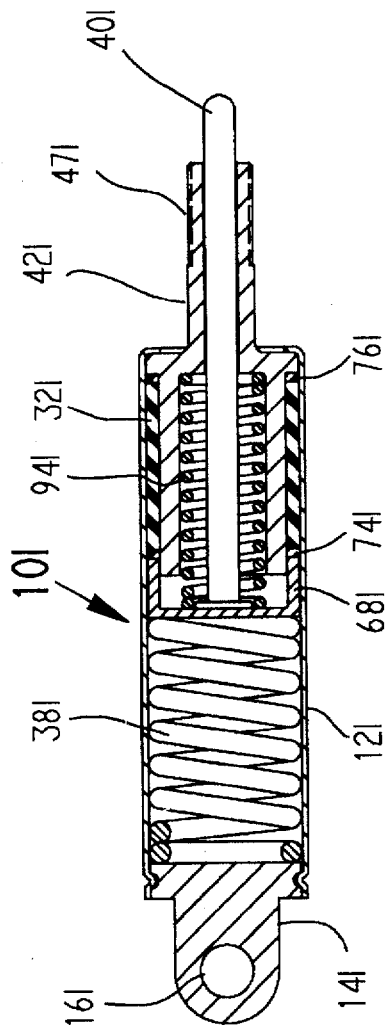
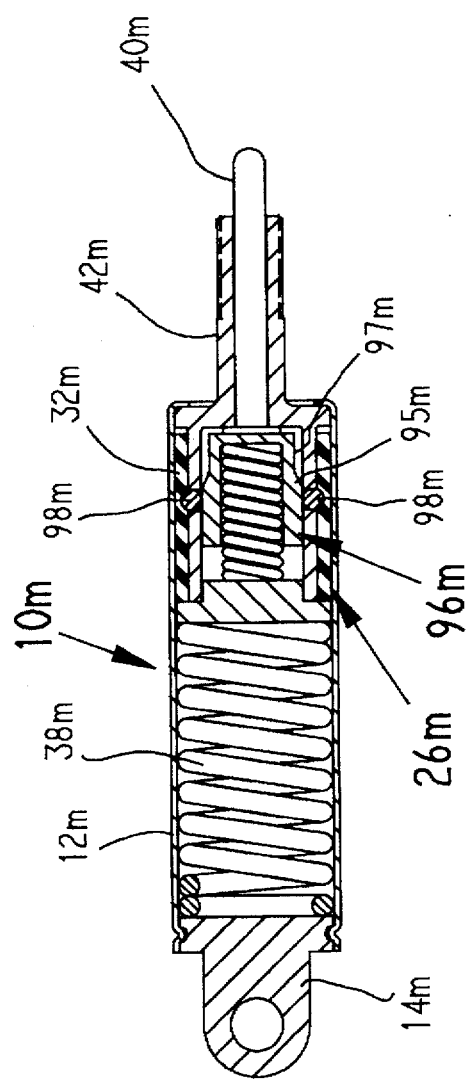
FIG. 13
FIG. 14

ADJUSTABLE, LOCKABLE DEVICES

BACKGROUND AND SUMMARY OF THE INVENTION

The present invention is directed to improved strut designs. More particularly, this invention involves a plurality of embodiments of struts and other devices which can be adjusted over a range of positions and locked in the position desired. The present application is related to application Ser. No. entitled "Locking and Positioning Device" filed contemporaneously herewith.

The present invention involves a number of applications of surface effect locking devices, the surface effect principles having been disclosed in conjunction with dampers in commonly assigned U.S. Pat. Nos. 5,183,137 and 5,257,680 which are incorporated by reference. One particular application involves seat height adjustment devices. A second such application is in the area of seat back adjustment. A third utilization is in chair arm height adjustment. Currently, a variety of gas springs and hydraulic cylinders are being utilized to provide the desired adjustments.

These devices have a number of difficulties. First, most such devices lack any damping in either the extending or retracting direction. Stopping of movement, then, is typically abrupt, with a hard stop providing stroke limits. High pressure sealing requirements necessitate strict manufacturing tolerances, typically accelerate wear of the seals resulting in leakage and the possibility of catastrophic failure. For certain applications, the ratio of stroke length to device length proves to be too small for many of these devices (i.e., inherent inefficiencies and lack of flexibility result in these mechanisms providing limited stroke length in a lengthy package). Recent legislation relating to the ergonomics of office furniture have made existing adjustment mechanisms inadequate to meet the legislative requirements.

The present invention provides an adjustable, lockable strut which overcomes these difficulties. The strut typically includes an outer cylindrical member; an inner cylindrical member; locking means including a first annular spring member surrounding at least a portion of an outer periphery of said inner cylindrical member and engaging at least a portion of an inner periphery of said outer cylindrical member; an element for causing said annular spring member to undergo bulging normal to the locking surfaces and in direct contact with a portion of said annular spring member to cause said radial bulging thereby increasing a resistance force exerted by said annular spring member to movement between said inner and said outer cylindrical members; an actuator moving said element for causing said annular spring member to undergo radial bulging, from a first bulge-producing position to a second inoperative position where said resistance force is significantly reduced; whereby said inner cylindrical member can be locked in a first axial position with respect to said outer cylindrical member by said spring member, unlocked by said actuator and moved to a second alternate axial position and relocked in said second alternate axial position.

In one preferred embodiment, the first spring comprises an elastomeric spring comprised of an annular ring positioned on a piston member within a cylinder. The elastomer is caused to bulge outwardly into engagement with the inner wall of the cylinder producing the surface effect locking force which inhibits axial movement. The elastomeric spring can be made to bulge by axially compressing the ring or by camming a plurality of movable elements into engagement with one of its axially extending surfaces. In the case of the axial compression, a second spring is used to bias a compression member into engagement with an end portion of the first spring. As another feature, a second elastomeric ring rides upon a tapered surface to provide a directionally increasing/decreasing baseline resistance to motion of the second cylindrical member with respect to the first cylindrical member. This second damping ring helps provide a smooth feel to the relative movement of the elements. A third, or return, spring can be used to bias the piston member to an extended position within the cylinder. Such a feature is useful in position adjustment devices such as seat-height, arm-height and seat-back adjustment devices and other applications currently utilizing gas springs.

In a second embodiment, the locking spring is formed as a coil spring which engages an elastomeric sleeve to produce the desired locking. Axial compression of the coil spring causes radial bulging as with the elastomeric spring. In an alternate embodiment, the locking spring takes the form of a fluid filling a portion of the cylinder and a reservoir of fluid which may take the form of an auxiliary chamber atop the cylinder or a secondary cylinder surrounding the first cylinder. A valve permits fluid to flow from the cylinder to the auxiliary chamber so that the relative positions of the inner and outer cylinders can be adjusted.

It is an additional feature of this invention that the locking mechanism may be actuated remotely using an electromagnetic coil to provide an actively variable damper whose damping characteristics can be switched between two damping levels.

Various other features, advantages and characteristics of the present invention will become apparent after reading the following detailed description and the addended claims.

BRIEF DESCRIPTION OF THE DRAWINGS

FIG. 1 is a cross-sectional side view of a first embodiment of the strut of the present invention;

FIG. 1A is a bottom perspective view of an office chair employing one or more of the struts of the present invention;

FIG. 1B is a side view in partial section depicting the strut of the present invention embodied in an arm adjustment mechanism;

FIG. 2 is a cross-sectional side view of an enlargement of the strut shown in FIG. 1;

FIG. 3 is a cross-sectional side view of a second embodiment of the strut of the present invention;

FIG. 4 is a cross-sectional side view of a modification to the embodiment of FIG. 3;

FIG. 13 is a cross-sectional side view of an eleventh embodiment which is a fifth variation of the FIG. 8 embodiment; and FIG. 14 is a cross-sectional side view of a twelfth embodiment of the strut of the present invention.

DETAILED DESCRIPTION OF THE PREFERRED EMBODIMENTS

Figure 5:
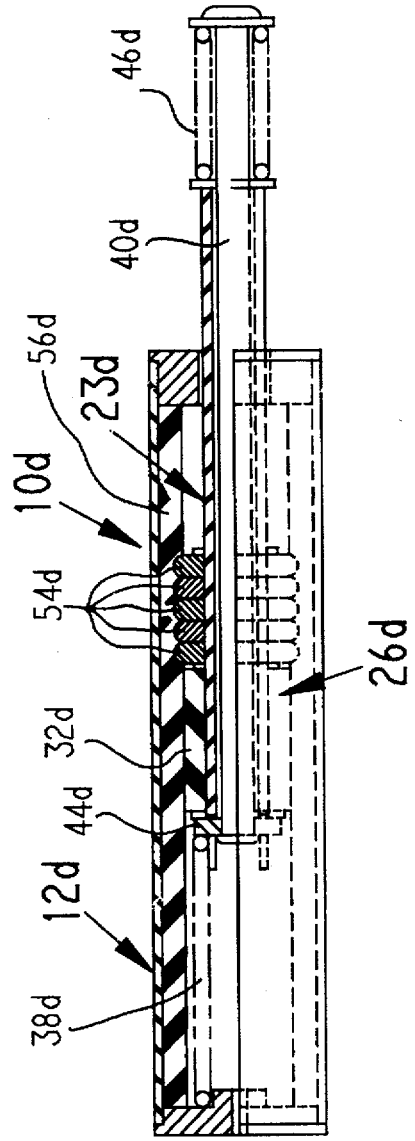
FIG. 5 is a side view of a fourth embodiment of the strut of the present invention in partial section.

A first embodiment of the adjustable, lockable strut of the present invention is depicted in FIG. 1 generally at 10. FIG. 1A depicts an office chair 11 with a seat portion 13, seat back 15, a pedestal 17 and castered leg portion 19. A first position for the adjustable strut 10 of the present invention is position A within the pedestal 17 to make the height of seat portion 13 adjustable. A downsized version of any of the embodiments of the strut 10 of the present invention can be used in position B shown in FIG. 1A to adjust the position of seat back 15 relative to seat portion 13. Still a third use of a midsized strut 10 is shown in FIG. 1B at position C. In this application, strut 10 can be used to adjust the arm height of the office chair. Actuator lever 21 can be manually pulled downward to release the locking mechanism 20 which will be described in greater detail infra. The sister application noted supra, describes and claims various multiple degrees of freedom adjustment devices for use in chair arm adjustment applications. It will be appreciated that the adjustable, lockable strut 10 of the present invention can be utilized in many other potential applications including many of the current uses of gas springs.

Returning to FIG. 1, adjustable, lockable strut 10 a first outer cylindrical member 12 which is closed at a first end by element 14 which has attachment groove 16 which permits securement to a first component such as a chair base, or the like, by a circlip, not shown. The second opposite end is closed by element 18. The locking mechanism 20 includes an inner cylindrical member 23 with a first end 22 with means 24 attachable to a second component such as a chair seat, or the like. Inner cylindrical member 23 includes an inner generally cylindrical piston member or pilot 26 and an actuator 36. Piston member 26 has a first forward, generally cylindrical portion 28 and a second trailing portion 30 which tapers outwardly toward first end 22 by an amount which may vary between 1° and 5°. The amount of taper is selected to produce a lateral compression of between 5 and 20% of sleeve 34. Elastomeric members 32, 34 are preferably coated with either powdered silicon resin or powdered organic rosin. This coating increases frictional resistance to sliding by the elastomeric members 32, 34 relative to outer cylindrical member 12 when the elastomeric member is bulging and decreases frictional resistance when the elastomeric member is not bulging.

First cylindrical portion 28 is encircled by a spring 32 which in this embodiment takes the form of an elastomeric ring, and second tapering portion has an elastomeric element 34 girding it. An end stop 35 is spaced from intermediate stop 33 by a distance greater than the length of ring 34. Accordingly, ring 34 can move axially on tapered section 30 as can be seen by noting the difference in position thereof between FIGS. 1 and 2. As ring 34 rides up the taper, the level of resistance to motion will increase. Ring 34 provides an initial resistance to motion when actuator 36 is unlocked, a resistance which increases for motion of the piston 26 in a contracting direction and which decreases for motion in an expanding direction.

Return spring 38 biases piston 26 toward the second end of outer cylinder 12 as shown in FIG. 2. Hence, when the locking mechanism 20 is released, return spring 38 moves piston 26 toward the right in FIG. 1. In the chair height adjustment application, when the actuator 36 is engaged and the seat unweighted, the return spring will raise the chair to its maximum height (FIG. 2). With the actuator still engaged, the seat operator can sit in the chair and lower it to the height desired and release the actuator 36 to lock the chair at the desired height. Ring 34 will move to its lowermost position (leftmost in FIG. 1) to exert a minimum level of resistance to movement as the spring forces the chair upwardly (to the right in FIG. 1). The ring 34 will climb the taper of section 30 increasing the pressure exerted on inner surface of outer cylinder 12 to slow the rate of downward movement against the upward bias of spring 38 to facilitate the desired adjustment.

The actuator mechanism includes actuator rod 40 extending through the center of outer sleeve 42 and piston 26 of locking mechanism 20. The end of rod 40 is secured to actuator plate or element 44 so element 44 moves with rod 40. Actuator element 44 has a protruding annular rim 45 which may be integral or formed by a separate washer-like member. The opposite end of rod 40 is biased by spring 46 to an extended position (to the right in FIG. 1). This spring biasing causes element 44 to axially compress elastomeric ring 32 to cause radial expansion of locking mechanism 20 in position to space the first and second components relatively, as desired.

A second embodiment of the adjustable lockable strut is depicted in FIG. 1B. This intermediate length strut 10 is shown in a chair arm adjustment application. Locking mechanism 20a comprises an elastomeric spring 32a encircling inner member 23a and abutting intermediate stop 33a. Biasing spring 46a biases actuator element 44a into the leading end of elastomeric spring 32a axially compressing the elastomer causing radial expansion which locks inner cylindrical member 23a in place relative to outer cylindrical member 12a. Actuator rod 40a has a plunger 48a formed on one end thereof which engages the top of spring-biased element 50a which is attached to actuator rod extension 52a. Rod extension 52a projects through end cap 14a and is secured to actuator element 44a. When actuator lever 21a is moved downwardly by pulling on knob 25a, actuator rod 40a overcomes the biasing force of spring 46a allowing elastomeric spring 32a to expand axially thereby contracting radially. The chair arm 27 can then be moved up and down (as well as rotationally about the axis of inner member 23a) to adjust the height thereof as desired. A support spring (not shown) can be added to raise the arm to its uppermost position when unlocked, if desired.

FIGS. 3 and 4 depict two fluid embodiments of adjustable lockable struts 10b and 10c. Inner cylindrical members 23b and 23c are equipped with a plurality of protrusions 54b and 54c, respectively, which serve to indent elastomeric sleeve 56b and 56c which are secured within outer cylindrical members 12b and 12c. Protrusions 54b and 54c interact with elastomeric sleeves 56b and 56c to serve as a fluid seal and to cause surface effect (a combination of hysteresis and friction) damping in the manner described in U.S. Pat. No. 5,257,680 which is hereby incorporated by reference. These embodiments have been designed for utilization in the seat-height-adjustment application where the weight of the chair seat will be countered by the force of the return springs 38b and 38c and the pressures of fluids 58b and 58c.

The fluid may be either compressible (pneumatic) or incompressible (hydraulic) with the resultant systems having very different characteristics. If the fluid 58b or 58c is compressible, the fluid volume will behave as a second spring acting in parallel to spring 38b and 38c. If the fluid is incompressible, the system will lock in place and perform very stiffly. Some of the stiffness can be designed out of the system by the configuration of the valves 60b and 60c which control flow between high pressure cylinder 12b, 12c and accumulator 62b, 62c. In addition, a portion of closed cell foam can be employed in the upper portion of elastomeric sleeves 56b, 56c to provide added compliance to the system.

In the FIG. 3 embodiment, diaphragm 64b biases actuator 36b to an up, or closed, position in which valve 60b is closed preventing fluid from flowing between accumulator 62b and cylinder 12b. By depressing actuator 36b against the bias of diaphragm 64b, valve 60b is opened permitting fluid to flow. If the seat 13 is unweighted, spring 38b will extend inner cylindrical member 23b to its fully extended position. If the chair operator is occupying the seat 13 when actuator 36b is depressed, the seat 13 will lower until the desired height is reached and the actuator 36b is released. By sizing spring 38b to engage the interior walls of elastomeric sleeve 56b, additional damping can be designed into the system to provide the desired feel and operational characteristics.

In the FIG. 4 embodiment, accumulator 62c takes the form of a twin tube 66c surrounding outer cylindrical member 12c. Valve actuator 36c is biased to its upper (closed) position by a spring member (not shown) within valve 60c. Siphon tube 68c is provided connecting the valve 66c to fluid 58c in twin tube 66c. This embodiment can only be utilized in an upright position whereas the embodiment of FIG. 3 need not be maintained vertically.

Figure 6:
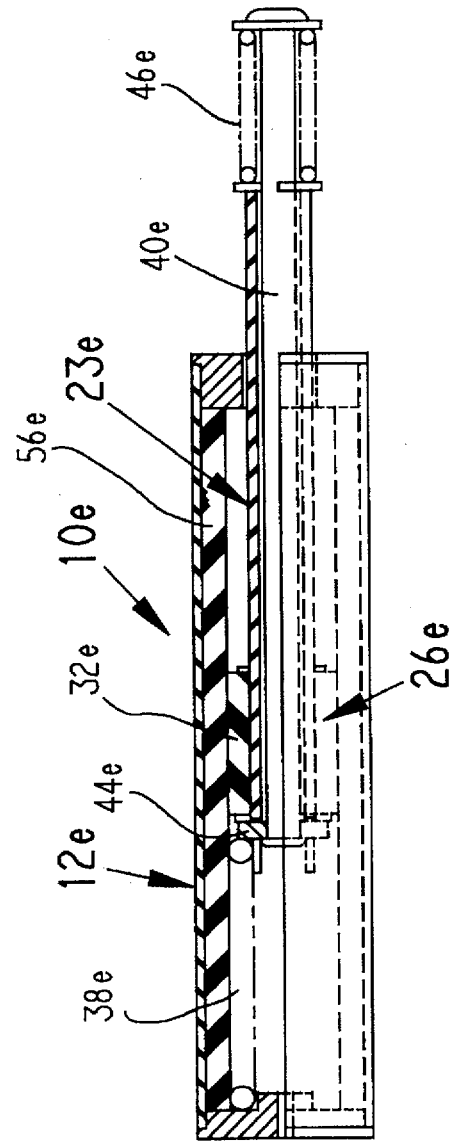
FIG. 6 is a side view of a fifth embodiment, in partial section, similar to that shown in FIG. 5.
Figure 7:
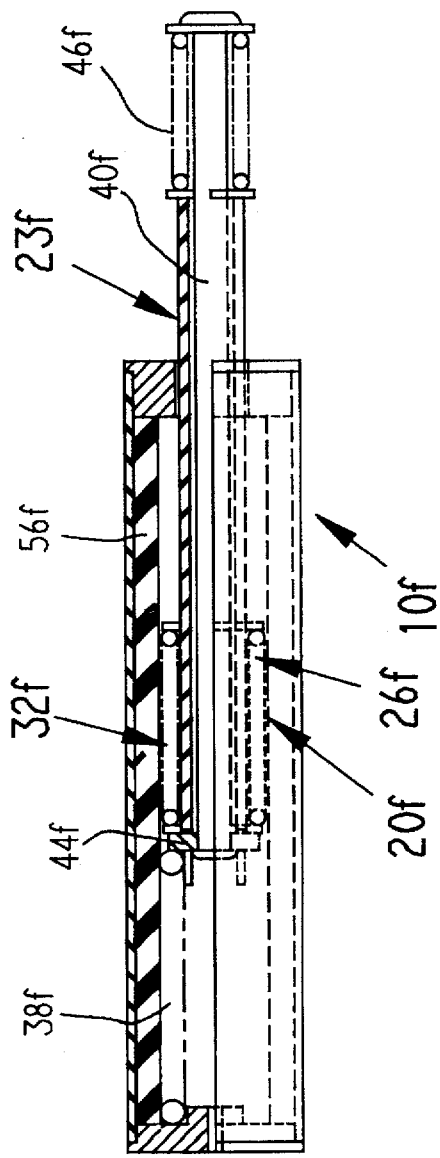
FIG. 7 is a side view of a sixth embodiment, in partial section, which is also a variant of the FIG. 5 embodiment.

FIGS. 5, 6 and 7 depict three related embodiments originally designed for use as seat height adjustment devices for use in position A (FIG. 1A). However, smaller versions could be implemented in the seat back adjustment application (position B) and the arm height adjustment application (position C). In the FIG. 5 embodiment, strut 10d includes an inner cylindrical member 23d with annular protrusions 54d for indenting elastomeric sleeve 56d. Biasing spring 46d forces actuator rod 40d to an extended position causing actuator element 44d to engage and axially compress ring 32d. When biasing spring 46d is collapsed releasing compression of ring 32d, return spring 38d, in the absence of any resisting force, will return piston 26d to the fully extended position. Protrusions 54d provide an initial level of damping (i.e., resistance to axial movement).

FIGS. 6 and 7 demonstrate two embodiments of strut 10e and 10f in which inner cylindrical members 23e and 23f have no separate protrusions. Hence all initial or floor value for damping are the result of precompression of the outer sleeve 56e,f by spring 32e,f. Note, by also properly dimensioning return springs 38e and 38f, an increased amount of floor level damping can be provided, if desired. For those applications where not only is such a floor level not desired, but locking mechanism 20e,f, is not to function as an actual lock but merely as an adjustment between a high damping level and a low damping level, then spring members 32e and 32f can be coated with a low coefficient of friction material such as Teflon® polymer, and the surface of sleeves 56e and 56f treated with an appropriate lubricant. Some gas spring substitutionary applications (e.g., automobile hatchback extenders) require such capabilities. For such an application, the return spring 38f will be positioned on the other side of piston 26f and return it toward the collapsed (as opposed to the extended) position.

Figure 8:
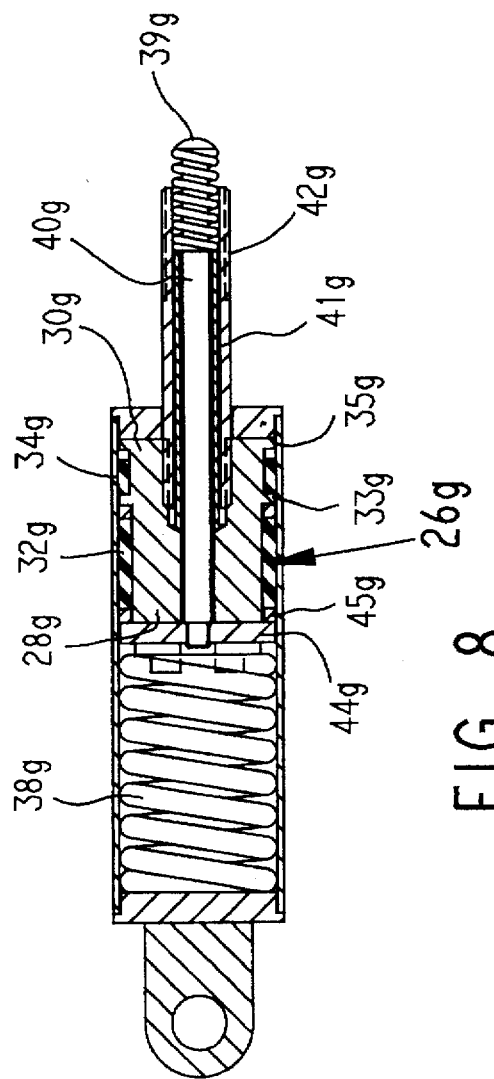
FIG. 8 is a cross-sectional side view of a seventh embodiment which is a compact version of the strut of the present invention.

FIGS. 8–13 depict six embodiments of a downsized adjustable lockable strut 10g–l which can be used in the seat back adjustment position B (FIG. 1A). In FIG. 8, piston 26g has a first cylindrical portion 28g and a second trailing portion 30g which may have a 1°–5° taper, as had the FIG. 1 embodiment. As with the FIG. 1 embodiment, the length of second portion 30g between intermediate stop 33g and end stop 35g exceeds the length of second ring 34g. First ring 32g is collapsed axially by rim 45g of actuator element 44g to provide the radial bulging which results in locking. Return spring 38g biases piston 26g toward its extended position. In this embodiment, biasing spring 46g is received within outer sleeve 42g and acts between intermediate sleeve 41g and head 39g on actuator rod 40g to bias rod 40g to an extended position.

Figure 9:
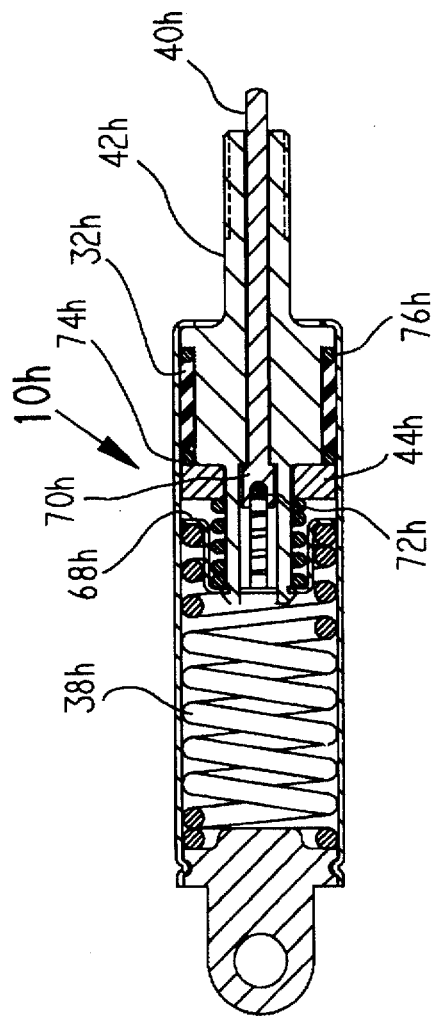
FIG. 9 is a cross-sectional side view of a is a seventh embodiment which is a variation of the FIG. 8 embodiment.
Figure 10:
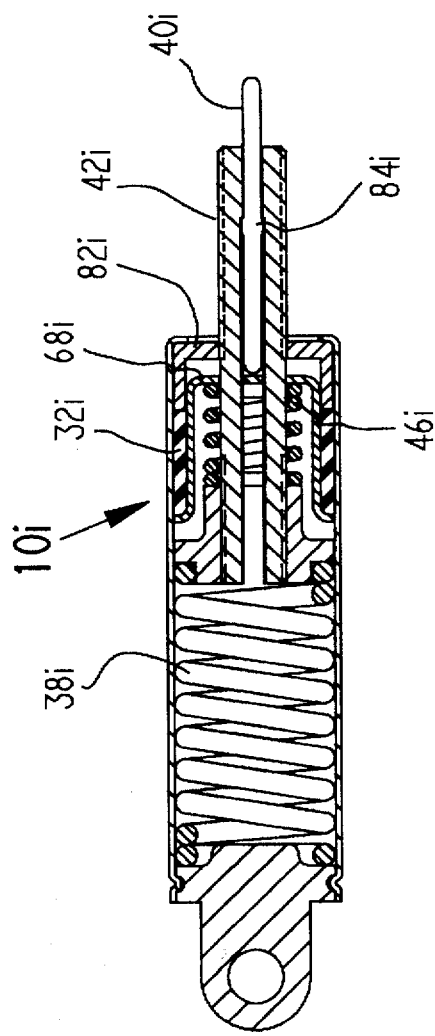
FIG. 10 is a cross-sectional side view of an eighth embodiment which is another variation of the FIG. 8 embodiment.

FIGS. 9 and 10 depict two additional embodiments of the smaller version of adjustable, lockable strut 10h and 10i. In the FIG. 9 embodiment, actuator rod 40h extend through an outer sleeve member 42h and has a U-bracket 70h which engages a crossbar 72h which forms a part of the actuator element 44h which in this embodiment may comprise a washer-like member of Delrin® polymer. Biasing spring 46h is positioned between actuator element 44h and a cup element 68h. Return spring 38h engages the underside of cup element 68h. A pair of stiff O-rings 74h and 76h confine elastomeric spring 32h, with O-ring 74h performing the same function as rim 45g in the previous embodiment.

In the FIG. 10 embodiment, actuator rod 40i engages the topside of inverted cup element 68i with biasing spring 46i acting between the inner bottom of cup 68i and a flange 78i on threaded washer 80i. Threaded washer 80i permits the compression of elastomeric spring 32i to be adjusted by varying the position of washer 80i on externally threaded outer sleeve 42i. Collar 82i is also threaded on the exterior of outer sleeve 42i for ease of assembly. The bore 43i through outer sleeve 42i is stepped and actuator rod 40i has a bulge 84i which prevents rod 40i from falling out.

Figure 11:
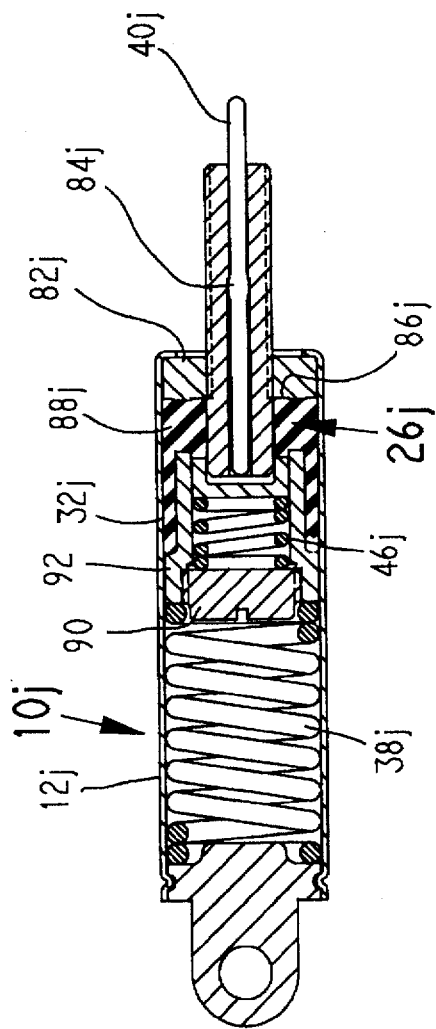
FIG. 11 is a cross-sectional side view of a ninth embodiment which is a third variation of the FIG. 8 embodiment.

FIG. 11 depicts another embodiment of strut 10j in which an outer elastomeric ring 32j is interconnected to an inner ring 86j by a radially oriented, intermediate transition section 88j. Plug 90j is threaded into sleeve 92j and provides a reaction surface for biasing spring 46j which forces cup 68j axially into inner ring 86j. The pressure applied to inner ring 86j is transferred to outer ring 32j by transition section 88j. The elastomer in these three elements (32j, 86j and 88j) acts as a solid fluid in locking piston 26j in place relative to outer cylindrical member 12j. An axial force of biasing spring 46j in the amount of between 10 and 20 pounds is hydraulically magnified by the ratio of the external surface area of ring 32j to the surface area of inner ring 86j in contact with cap 68j, to produce a locking force of 200 pounds. The other embodiments described herein are capable of producing similar levels of locking forces. As with previous embodiments, axial force applied to actuator rod 40j counter to the force exerted by biasing spring 46j unloads the inner ring 86j permitting the transition section to flow inwardly unloading outer ring 88j such that piston 26j can be moved within housing 12j to an alternate position against the bias of return spring 38j.

Figure 12:
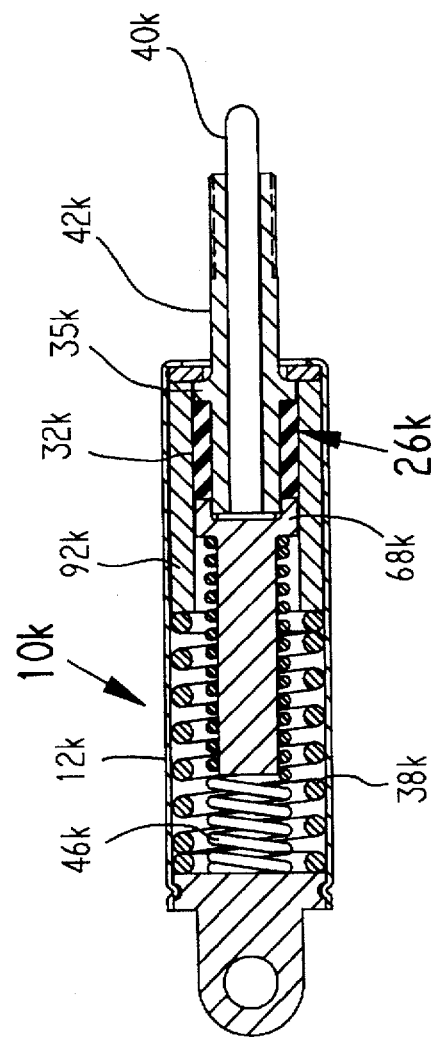
FIG. 12 is a cross-sectional side view of a tenth embodiment which is a fourth variation of the FIG. 8 embodiment.

In the FIG. 12 embodiment, elastomeric spring 32k is compressed between end stop 32k formed on outer sleeve 42k and cup 68k which has an extension 94k received within biasing spring 46k. Elastomeric spring 32k expands radially as before locking piston 26k within sleeve 92k. Sleeve 92k may be of a self-lubricating material such as Teflon® polymer and is free to move within housing 12k. Return spring 38k biases sleeve 92k and piston 26k locked therewith, to the fully extended position. This embodiment permits relative movement between the two elements which are interconnected by strut 10k, influenced by the force of spring 38k. If additional damping is desired, a sleeve similar to 34 in the FIG. 1 embodiment can be provided about the exterior of sleeve 92k. The piston 26k may be positioned within sleeve 92k as before by depressing actuator 40k to a level sufficient to offset the preload provided by biasing spring 46k. In the seatback adjustment application, strut 10k will permit angular or axial adjustment of the seatback (depending on the nature of the mechanism with which it is used) and still provide the springiness afforded by most seatbacks about an adjusted position.

FIG. 13 depicts an embodiment of strut 101 in which spring 381 performs both the return function and the preload of elastomeric spring 321. A counter-balance spring 941 is provided which surrounds actuator rod 401. Hard elastomeric rings 741 and 761 are positioned at each end of spring 321 to take the wear and tear. Return spring 381 engages the lower side of cup 681 which is biased against ring 741. As with earlier embodiments, the upper region 471 of outer sleeve 421 is threaded for attachment to one element while first end closure 141 has an hour glass shaped opening (double frustoconical tapers meeting in the middle at a minimum diameter) 161 for attachment to a second element by means of a clevis, or the like. Also, as with previous embodiments, actuator rod 401 may be engaged (in conjunction with counter-balance spring 941) to overcome the bias of spring 381, unloading elastomeric spring 321 to release the locking due to bulging, permitting adjustment of the position of piston 261 within housing 121.

FIG. 14 depicts a modified version of strut 10m. In this embodiment, elastomeric spring 32m is biased outwardly by a cam member 96m forcing a plurality of balls (preferably a minimum of four, two being shown) 98m outwardly into the elastomer. This produces a similar bulging of elastomeric spring 32m outwardly into locking engagement with outer cylindrical member 12m. By depressing actuator rod 40m, cam surface 95m will be displaced permitting balls 98m to move into recesses 97m. This will relieve the force created by the bulging and permit the position of piston 26m to be adjusted as desired. Biasing spring 46m encourages cam surface 95m into the ball-biasing position shown in FIG. 14. As is generally the case, return spring 38m encourages piston 26m to the fully extended position, the force of which must be manually overcome to permit adjustment to alternate positions.

Figure 15:
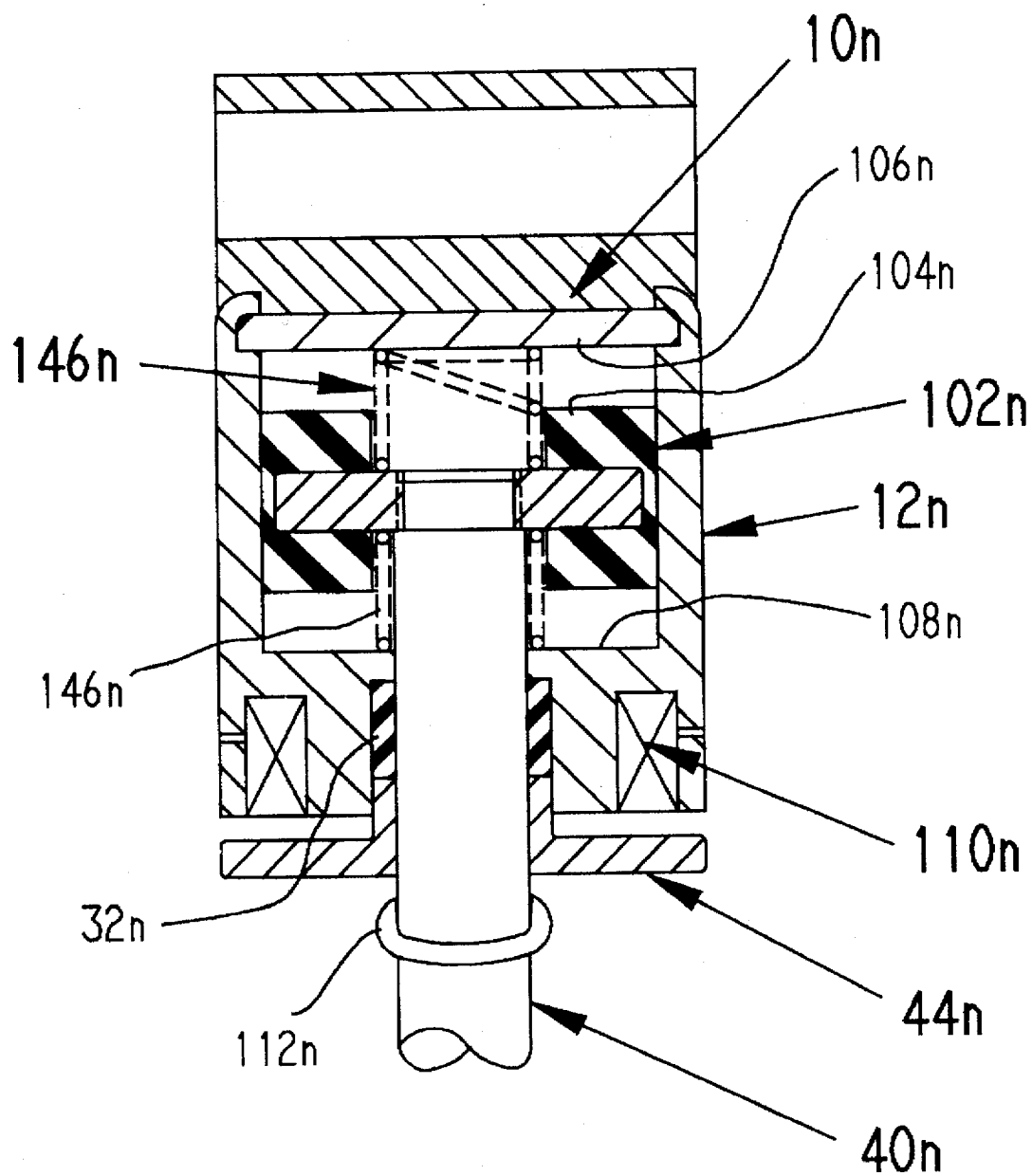
FIG. 15 is a cross-sectional side view of a thirteenth embodiment of the strut of the present invention.

FIG. 15 depicts the use of the locking concept of the present invention shown in a different context. Strut 10n includes an actuator rod 40n attached to a first relatively movable member (not shown) and an outer cylindrical member 12n attached to a second relatively movable member (not shown). Snubber damper 102n is threaded onto one end of rod 40n and biased to a centered neutral position by upper and lower centering springs 146n. Under normal operations, low amplitude relative motions will be resisted only by centering springs 146n and therefore no vibration will be transmitted between the first and second relatively movable members. Larger amplitude vibrations will cause elastomer 104n of snubber damper 102n to engage the ends 106n or 108n of outer cylindrical member 12n.

Should it be desired that the first and second relatively movable members be locked together for movement, electromagnetic coil 110n can be energized attracting actuator element 44n into engagement with the end of elastomeric spring 32n causing it to bulge outwardly into engagement with the recess 120n in housing 12n, locking rod 40n to housing 12n. The strength of the magnetic field can be varied to adjust the level of clamping force, if desired. A shoulder 112n can be provided on actuator rod 40n as a platform for the element 44n to rest upon when the coil 110n is de-energized. Such a shoulder 112n can be formed by cold rolling techniques or, alternatively, an O-ring could be utilized to provide an adjustably positioned shoulder 112n. Obviously, the switch means of the present embodiment could be implemented in any of the previous embodiments, if desired.

Various changes, alternatives and modifications will become apparent after a reading of the foregoing detailed description and appended claims. It is intended that all such changes, alternatives and modifications as fall within the scope of those appended claims be considered to be part of the present invention.

What is claimed is:

1. A strut which may be adjusted to, and locked in, a particular desired position comprising
   a) an outer cylindrical member having an inner periphery;
   b) an inner cylindrical member having an outer periphery;
   c) locking means including
      i) a first spring member surrounding at least a portion of said outer periphery of said inner cylindrical member and engaging at least a portion of said inner periphery of said outer cylindrical member;
      ii) an element for causing said first spring member to undergo radial bulging to thereby increasing a resistance force exerted by said first spring member to movement between said inner and said outer cylindrical members;
      iii) an actuator moving said element from a first bulge-producing position to a second inoperative position where said resistance force is significantly reduced;
   whereby said inner cylindrical member can be locked in a first axial position with respect to said outer cylindrical member by said first spring member and unlocked by said actuator for movement to a second alternate axial position.

2. The strut of claim 1 wherein said first spring member comprises an annular elastomeric member.

3. The strut of claim 2 wherein said element for causing said first spring member to undergo radial bulging includes means to engage end portions of said elastomeric member to cause axial compression of said member which results in said radial bulging thereof.

4. The strut of claim 2 wherein said element for causing said first spring member to undergo radial bulging includes a plurality of spherical balls which are cammed into engagement with a peripheral portion of said elastomeric member.

5. The strut of claim 2 further comprising a coating applied to said elastomeric member which said coating increases frictional resistance to sliding of said elastomeric member relative to said outer cylindrical member when said elastomeric member is bulging and decreases frictional resistance when said elastomeric member is not bulging.

6. The strut of claim 5 wherein said coating is selected from the group consisting of powdered silicone resin and a powdered organic rosin.

7. The strut of claim 2 further comprising a second annular spring member contacting a first end portion of said outer cylindrical member and a first axial end of said inner cylindrical member to bias said inner member toward a second end portion of said outer cylindrical member.

8. The strut of claim 7 further comprising spring means biasing said actuator to said first position.

9. The strut of claim 8 wherein said second annular spring member and said spring means are the same member.

10. The strut of claim 1 further comprising a rubbing member having a plurality of surface protrusions for engaging and deforming an inner elastomeric sleeve secured to an inner surface of said outer cylindrical member.

11. The strut of claim 10 wherein said first spring member is an annulus of fluid.

12. The strut of claim 11 further comprising a reservoir of fluid interconnected to said annulus of said fluid by means of a valve.

13. The strut of claim 12 wherein said reservoir comprises a third cylindrical member surrounding said outer cylindrical member.

14. The strut of claim 1 further comprising an annular elastomeric sleeve positioned between said inner and said outer cylindrical members providing an initial level of resistance to motion of said inner cylindrical member relative to said outer cylindrical member.

15. The strut of claim 14 wherein said annular elastomeric sleeve is received within an annular recess formed about said inner cylindrical member, said annular recess having an axial length which exceeds the axial length of said annular elastomeric sleeve.

16. The strut of claim 15 wherein a depth of said annular recess tapers radially outwardly from a first axial end to a second axial end such that said initial level of resistance varies as said elastomeric sleeve slips in a first direction from said first axial end to said second axial end as said inner cylindrical member moves in a second opposite direction relative to said outer cylindrical member.

17. The strut of claim 1 further comprising mechanical means for actively controlling the position of said actuator.

18. The strut of claim 1 wherein said first spring member comprises a coil spring which engages a surface portion of an elastomeric sleeve associated with one of said inner and said outer cylindrical members to create a surface effect damping force.

19. A lockable device for adjustably positioning one cylindrical element relative to a second cylindrical element, said lockable device comprising a) an annular elastomeric sleeve positioned between said first cylindrical element and said second cylindrical element;

b) a coating formed upon at least a portion of an exterior surface of said annular elastomeric sleeve, said coating being selected from the group consisting of powdered silicone resin and a powdered organic rosin;

c) means to engage a portion of said annular elastomeric sleeve causing said sleeve to bulge radially outwardly to increase a frictional resistance to movement between said first cylindrical element and said second cylindrical element whereby such movement is essentially prevented, locking said second cylindrical element in position relative to said first cylindrical element.

20. A controllable, lockable damper comprising a) a cylindrical housing having an axial bore having a first diameter, an inner recess adjacent one end of said cylindrical housing and having a second diameter which is smaller than said first diameter, said cylindrical housing being attachable to a first relatively movable member, b) an actuator rod at least partially receivable within said axial bore, said actuator rod being attachable to a second relatively movable member, c) a snubber damper received upon one end of said actuator rod and mounted for movement within said axial bore of said cylindrical housing;

d) an elastomeric ring encircling a portion of said actuator rod at a point within said inner recess of said housing;

e) an actuator member engageable with an axial end of said elastomeric ring to axially compress said ring to cause radially outward bulging thereof to cause said ring to engage said inner recess;

f) switch means designed to move said actuator member between a ring-compressing position and a non-compressing position;

whereby when said switch means is engaged to move said actuator member to said ring-engaging position said elastomeric ring radially bulges locking said rod in a fixed position relative to said housing.

* * * * *